US011407105B2

(12) United States Patent
Gregg, IV et al.

(10) Patent No.: US 11,407,105 B2
(45) Date of Patent: *Aug. 9, 2022

(54) VARIABLE STIFFNESS ACTUATOR WITH ELECTRICALLY MODULATED STIFFNESS

(71) Applicant: Board of Regents, The University of Texas System, Austin, TX (US)

(72) Inventors: Robert D. Gregg, IV, Richardson, TX (US); Edgar A. Bolivar, Richardson, TX (US); David P. Allen, Richardson, TX (US); Walter E. Voit, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,936

(22) Filed: Dec. 15, 2020

(65) Prior Publication Data

US 2021/0129323 A1  May 6, 2021

Related U.S. Application Data

(63) Continuation of application No. 16/111,072, filed on Aug. 23, 2018, now Pat. No. 10,870,202.
(Continued)

(51) Int. Cl.
 *H01H 1/24* (2006.01)
 *B25J 9/16* (2006.01)
 (Continued)

(52) U.S. Cl.
 CPC ........... *B25J 9/1633* (2013.01); *B25J 9/0009* (2013.01); *B25J 9/123* (2013.01); *B25J 9/1694* (2013.01); *B25J 19/068* (2013.01)

(58) Field of Classification Search
 CPC ........ B25J 19/068; B25J 9/0009; B25J 9/123; B25J 9/1633; B25J 9/1694
 See application file for complete search history.

(56) References Cited

U.S. PATENT DOCUMENTS 6,882,086 B2   4/2005  Kombluh et al.
7,923,902 B2   4/2011  Heim
(Continued)

OTHER PUBLICATIONS

Bolivar, et al., "Towards a Series Elastic Actuator with Electrically Modulated Sliffness for Powered Ankle-Foot Orthoses" IEEE International Conference on Automation Science and Engineering(CAS), 2016.
(Continued)

*Primary Examiner* — Muhammad S Islam

(57) ABSTRACT

A dielectric elastomer system (DES) variable stiffness actuator (VSA) is provided. In an embodiment, the DES VSA includes a variable stiffness module (VSM). The VSM includes a DES that softens when energized and stiffens when unpowered, an outer frame, and an inner frame member. The stiffness of the DES is variable. The outer frame supports the DES and the inner frame member, which is disposed within the DES. The inner frame member is configured to be displaceable with respect to the outer frame. The DES VSA also includes an actuation motor mechanically coupled to the inner frame member that is configured to cause a force to be applied to the inner frame member and the actuation motor is configured to control an equilibrium position of the DES VSA.

24 Claims, 11 Drawing Sheets

Related U.S. Application Data

(60) Provisional application No. 62/549,319, filed on Aug. 23, 2017.

(51) Int. Cl.
  *B25J 9/00* (2006.01)
  *B25J 19/06* (2006.01)
  *B25J 9/12* (2006.01)

(56) References Cited

U.S. PATENT DOCUMENTS

| | | | |
|---|---|---|---|
| 8,183,739 B2* | 5/2012 | Heim | G02B 7/102 |
| | | | 310/322 |
| 9,765,837 B2 | 9/2017 | Dastoor et al. | |
| 9,773,969 B2 | 9/2017 | Cutkosky et al. | |
| 9,871,183 B2 | 1/2018 | Cutkosky et al. | |
| 9,882,117 B2* | 1/2018 | Orita | H01L 41/047 |
| 2002/0175594 A1* | 11/2002 | Kornbluh | B60G 17/01941 |
| | | | 310/317 |
| 2007/0200457 A1* | 8/2007 | Heim | H01L 41/0986 |
| | | | 310/324 |
| 2007/0200466 A1* | 8/2007 | Heim | H01L 41/0986 |
| | | | 310/311 |
| 2007/0200468 A1* | 8/2007 | Heim | H02N 2/046 |
| | | | 310/311 |
| 2008/0116764 A1* | 5/2008 | Heim | G02B 13/009 |
| | | | 310/329 |
| 2009/0045042 A1* | 2/2009 | Browne | F16D 69/00 |
| | | | 204/157.15 |
| 2009/0174293 A1* | 7/2009 | Heim | H01L 41/0986 |
| | | | 310/354 |
| 2013/0207793 A1* | 8/2013 | Weaber | G08B 6/00 |
| | | | 340/407.2 |
| 2015/0287552 A1* | 10/2015 | Anderson | H03K 17/965 |
| | | | 200/276.1 |
| 2016/0082603 A1* | 3/2016 | Schimmels | B25J 9/1005 |
| | | | 267/158 |
| 2017/0222576 A1* | 8/2017 | Majidi | H02N 13/00 |
| 2017/0357641 A1* | 12/2017 | Okamoto | H04N 7/17354 |
| 2019/0366152 A1* | 12/2019 | Jafari | A63B 22/0228 |

OTHER PUBLICATIONS

Dastoor, et al. "Design of Dielectric Electroactive Polymers for a Compact and Scalabe Variable Stiffness Device" IEEE International Conference on Robotics and Automation, May 2012, 7 pages.

Diller, et al., "The Effects of Electroadhesive Clutch Design Parameters on Performance Characteristics" Journal of Intelligent Material Systems and Structures, 2018. pp. 1-25.

Diller, et al., "A lightweight, low-powe electroadhesive clutch and spring for exoskeleton actuation" 2016 IEEE International Conference on Robotics and Automation (ICRA), Stockholm, Sweden, May 16-21, 2016, pp. 682-6893.

Orita, et al., "Scalable Electroactive Polymer for Variable Stiffness Suspensions," IEEE/ASME Transactions on Mechatronics, vol. 21, No. 6, Dec. 2016, pp. 2836-2846.

Newton, et al., "Modeling and Characterization of Stiffness Controlled Robotic Legs Using Dielectric Elastomers," Electroactive Polymer Actuators and Devices, Proceedings of SPIE vol. 8340, 2012, 12 pages.

\* cited by examiner

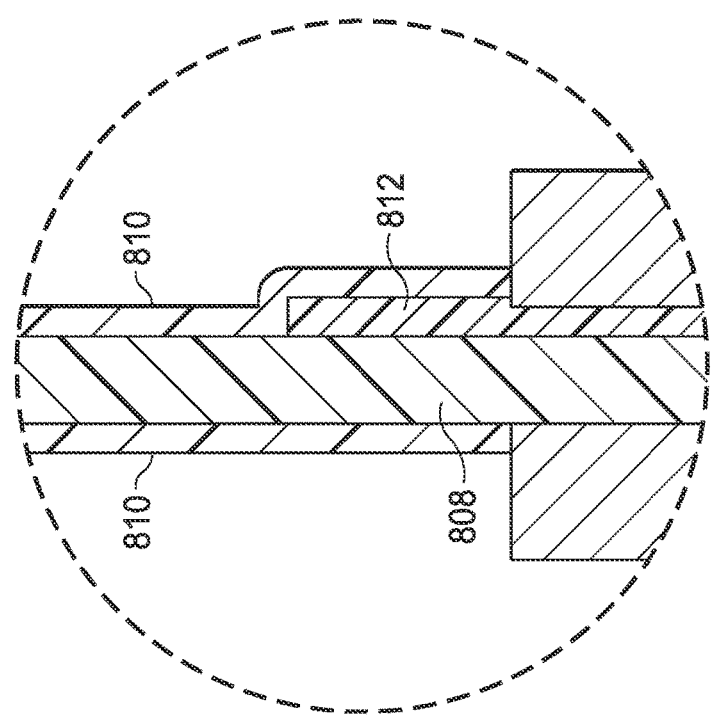
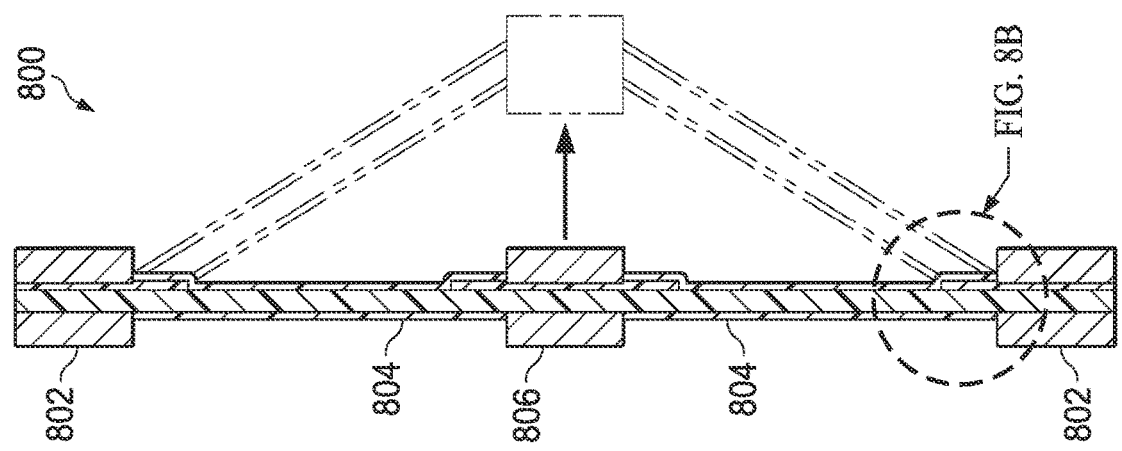

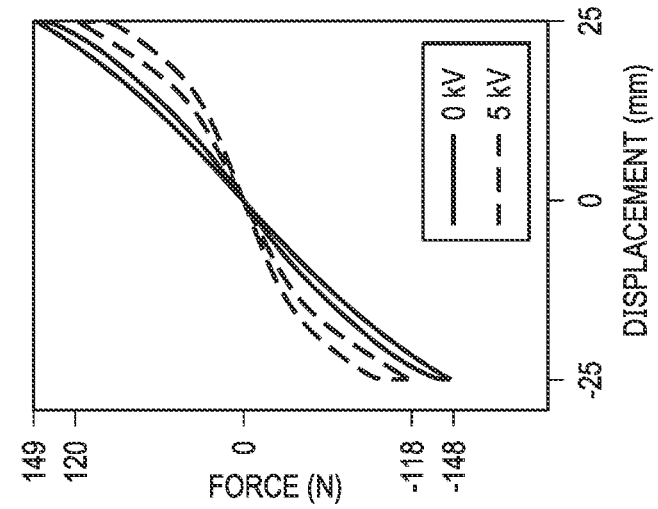
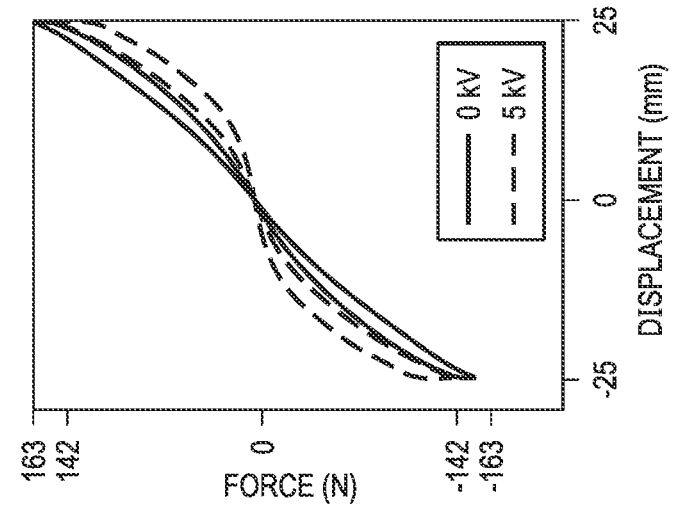
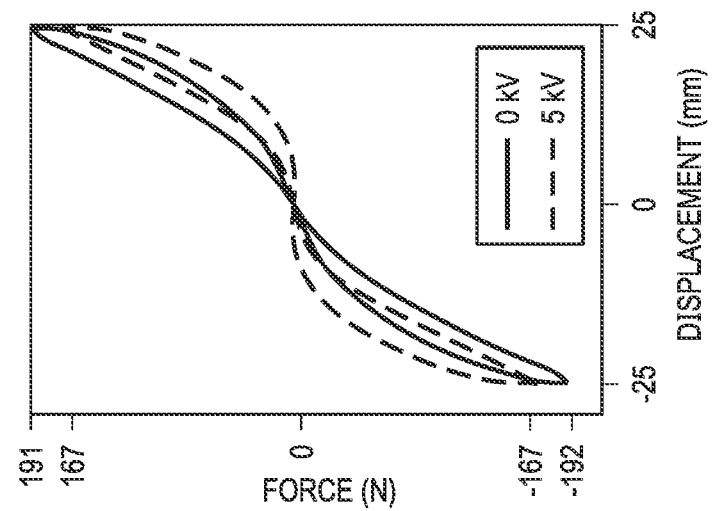

VARIABLE STIFFNESS ACTUATOR WITH ELECTRICALLY MODULATED STIFFNESS

CROSS-REFERENCE TO RELATED APPLICATION

This application is a continuation of U.S. application Ser. No. 16/111,072, filed on Aug. 23, 2018, entitled "VARIABLE STIFFNESS ACTUATOR WITH ELECTRICALLY MODULATED STIFFNESS," which claims the benefit of U.S. provisional application Ser. No. 62/549,319, filed on Aug. 23, 2017. The above-listed applications are commonly assigned with the present application are incorporated herein by reference as if reproduced herein in their entirety.

STATEMENT OF GOVERNMENT INTEREST

This invention was made with government support under grant number HD080349 awarded by the National Institutes of Health (NIH). The government has certain rights in the invention.

BACKGROUND

1. Field

The disclosure relates generally to robotics and actuators, and more specifically, to compliant actuators and variable stiffness actuators.

2. Description of the Related Art

Variable stiffness actuators (VSAs) are electromechanical actuators used, for example, for legged and gait assistance robots. VSAs are inherently compliant actuators with variable stiffness. VSAs have several advantages as compared to rigid electromechanical actuators for human-interactive and biomimetic robots. A VSA can use its compliant element to store and return mechanical energy, which may be more efficient than using a motor and battery to convert mechanical energy to electrical energy and then to chemical energy, and vice versa. The ability to store and return energy can improve the efficiency of robots performing cyclic tasks such as legged locomotion. If placed between the VSA's motor and load (as is usually the case), the compliant element decouples the motor and load inertias, which reduces the dissipation of energy caused by inelastic collisions. By compliantly absorbing impacts, the compliant element acts as a hardware safety feature that can prevent harm to humans or the actuator itself. In contrast, rigid actuators can only respond compliantly to impacts within their control system's bandwidth. A VSA can tune its compliance in order to minimize energy consumption or peak power requirements. The optimal choice of stiffness for these goals depends on the task and load, so VSAs are especially valuable in human-interaction applications where these conditions can vary greatly.

Despite these advantages, VSAs are difficult to implement in robots because of the additional components their variable stiffness mechanisms add to the actuator. These components usually include moving parts and an additional motor, and they increase the VSA's weight, volume, and cost, and decrease its durability compared to rigid actuators and fixed-stiffness series elastic actuators. In order to reduce weight, volume, and cost, the stiffness modulation motor is often much less powerful than the main drive motor, which limits the VSA's stiffness changing speed and may make it impossible for the VSA to change stiffness under load, though some VSAs can change stiffness in less than 0.5 seconds (s). Antagonistic VSA designs typically can change stiffness rapidly and under load, but they require more energy to change stiffness than other VSA designs.

Therefore, it would be desirable to have a method and apparatus that take into account at least some of the issues discussed above, as well as other possible issues. For example, it would be desirable to have a method and apparatus that overcome a technical problem with the excessive weight, the excess energy consumption, and the durability issues.

SUMMARY

According to one embodiment of the present invention, a dielectric elastomer system (DES) variable stiffness actuator (VSA) is provided. The DES VSA includes a variable stiffness module (VSM). The VSM includes a DES that softens when energized and stiffens when unpowered, an outer frame, and an inner frame member. The outer frame supports the DES and the inner frame member, which is disposed within the DES. The inner frame member is configured to be displaceable with respect to the outer frame. The DES VSA also includes an actuation motor mechanically coupled to the inner frame member that is configured to cause a force to be applied to the inner frame member, and the actuation motor is configured to control an equilibrium position of the DES VSA.

According to another embodiment of the present invention, a dielectric elastomer system (DES) variable stiffness actuator (VSA) is provided. The DES VSA includes a compliant membrane. The stiffness of the compliant membrane is adjustable by electrically energizing the compliant membrane. The compliant membrane is stiffer when unpowered than when powered. The DES VSA also includes a stiffness controller connected to the compliant membrane and configured to control the stiffness of the compliant membrane. The DES VSA also includes an actuation motor connected to the compliant membrane and configured to control an equilibrium position of the DES VSA. The DES VSA also includes a connector connecting the compliant membrane and the actuation motor to a load.

According to another embodiment of the present invention, a dielectric elastomer system (DES) variable stiffness actuator (VSA) is provided. The DES VSA includes a plurality of elastomer sheets. Each of the elastomer sheets is configured to soften when energized with an electric field and to become stiffer when unenergized. The DES VSA also includes a stiffness controller connected to the plurality of elastomer sheets. The stiffness controller is configured to control the stiffness of the plurality of elastomer sheets via application of a control voltage to the plurality of elastomer sheets. The DES VSA also includes a ball screw and an actuation motor coupled to the ball screw. The actuation motor is configured to adjust an equilibrium position of the DES VSA. The DES VSA also includes an input block configured to mechanically couple first ends of the elastomer sheets to the ball screw. The DES VSA also includes an output connection point; and a plurality of output blocks each configured to couple one or more of respective one or more of the plurality of elastomer sheets to the output connection point. The output connection point is configured to receive a load.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8A is a cross-section view of a DES module in accordance with an illustrative embodiment;

FIG. 8B is an expanded view of a portion of the DES module depicted in FIG. 8A;

FIGS. 10A, 10B, and 10C show plots of tensile test results showing the DES VSA's stiffness change;

DETAILED DESCRIPTION

Figure 1:
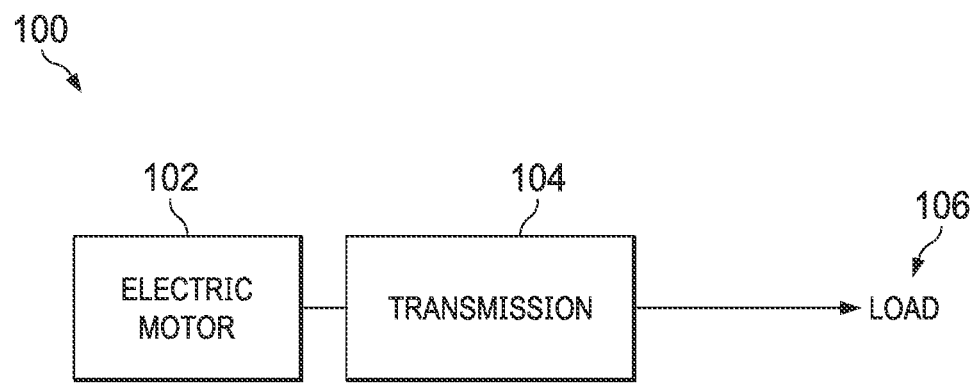
FIG. 1 is a schematic diagram of a typical robotic actuator.

The illustrative embodiments relate to VSAs. Dielectric elastomer systems (DESs) soften when charged with a constant voltage, providing electric modulation of stiffness. Disclosed herein are illustrative embodiments of VSAs that include a DES that softens when energized and stiffens when unpowered. In an embodiment, DESs are used to create a DES VSA with a mechanically simpler variable stiffness mechanism. In an embodiment, the DES VSA provides independent control of stiffness and equilibrium position with force output of, for example, 140 Newtons (N). No prior DES VSA can match this combination. In an embodiment, the disclosed variable stiffness mechanism has no sliding or rolling parts, and no bushings or bearings, yet still provides low-power stiffness modulation. In an embodiment, the DES VSA softens up to 52% and requires merely 262 milliwatts (mW) to hold that softened state. Unlike prior VSAs, embodiments of the disclosed DES VSA default to stiff behavior when unpowered. This results, for example, in reduced energy consumption for legged and gait-assistance robots during long periods of standing.

Perhaps the most promising electroactive polymers for "human-scale" robotics are dielectric elastomer systems (DESs) because they offer a unique combination of high stress and strain capacities, work density, strain rate, and energy conversion efficiency. DESs are simple mechanical devices, consisting of only a few components, none of which roll or slide. The core DES component is a thin layer of dielectric elastomer coated on its top and bottom faces with stretchable electrodes. When a constant voltage is applied across the electrodes, the stiffness of the DES in the plane of the dielectric layer decreases. When no voltage is applied, the DES defaults to a stiff state.

Disclosed herein are illustrative embodiments that use this softening property of DESs to create a variable stiffness actuator (VSA) with a simplified variable stiffness mechanism. As used herein, VSA refers to as an actuator that can change the stiffness of its compliant element. Such a device can modulate its stiffness to compensate for changes in gait parameters and loading conditions.

No prior DES VSA can control its inherent stiffness and equilibrium position independently and simultaneously, and few can exert forces greater than 100N. Because a VSA's actuation motor is compliantly coupled to the actuator output, its motion does not set the VSA's output position directly but rather its equilibrium position, the output position when no load is applied to the VSA. DES diaphragm modules, developed for variable stiffness suspensions, can vary their stiffness but not their equilibrium position, and early works did not demonstrate a force output greater than 1N. Coupling one or more diaphragm modules with a biasing mechanism results in a dielectric elastomer actuator that has one degree of freedom. Such an actuator changes both its stiffness and equilibrium position, but these two changes are coupled. Using a second DES diaphragm module as the biasing mechanism adds a second degree of freedom, but only partially decouples the control of stiffness and equilibrium position. A prior art DES orthosis can vary stiffness and equilibrium independently, but does so by using closed-loop control rather than modulating its inherent stiffness.

Embodiments of the disclosed DES VSA are simpler mechanically, yet still matches the functionality of the VSA state of the art. The variable stiffness mechanism of an embodiment of the disclosed DES VSA is mechanically simple, having no rolling or sliding parts, and can change stiffness while loaded. Unlike state-of-the-art VSAs, the disclosed DES VSA softens when energized and is thus "default-stiff," which is beneficial for applications requiring rigid, unpowered behavior such as robotic prosthetic legs. In an embodiment, the disclosed DES VSA can exert 140N making it more suitable for larger-scale robotic applications than previous DES VSAs. Embodiments of the disclosed DES VSA can also control their stiffness and equilibrium position independently and simultaneously unlike previous DES VSAs. In an illustrative embodiment, the disclosed DES VSA leverages the advantages of an electric motor and a DES: an easily-controlled electric motor with a ball screw transmission sets the equilibrium position, and inherently-compliant DES modules create and modulate actuator compliance.

With reference now to the Figures and, in particular, with reference to FIG. 1, a schematic diagram of a typical robotic actuator 100 is depicted. The actuator 100 includes an electric motor 102 and a transmission 104 that couples to a load 106.

Figure 2:
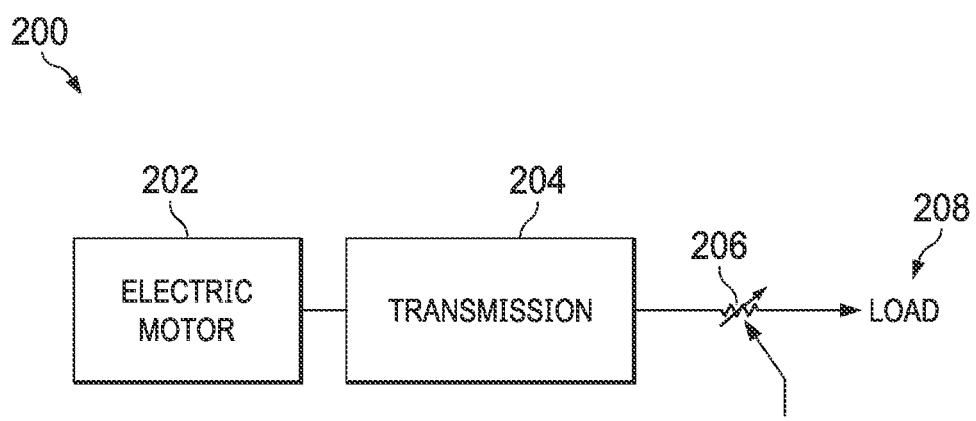
FIG. 2 is a schematic diagram of a DES VSA in accordance with an illustrative embodiment.

FIG. 2 is a schematic diagram of a DES VSA 200 in accordance with an illustrative embodiment. DES VSA 200 includes an electric motor 202, a transmission 204, and a compliant element 206 that couples to a load 208. The compliant element 206 may be treated mathematically as a spring with a spring constant, k. However, the spring constant, k, is not necessarily constant, but may vary with the strain, strain rate, and temperature of the compliant element 206. In an embodiment, the electric motor 202 is coupled to an electric motor controller (not shown) that controls the operation of the electric motor 202. The electric motor controller may include or be implemented as a data processing system. In an embodiment, the compliant element 206 has variable stiffness controlled by applying varying levels of electric voltage to the compliant element 206. Thus, in an embodiment, the spring constant, k, varies, depending on the level of the electric voltage applied. The addition of the compliant element 206 results in numerous benefits over a rigid actuator as depicted in FIG. 1. The compliant element 206 stores mechanical energy from the load 208 and returns mechanical energy to the load 208 thereby improving the efficiency of, for example, robots performing cyclic tasks such as legged locomotion. Additionally, the compliant element 206 decouples the motor 202 and load 208 inertias, which reduces the dissipation of energy caused by inelastic collisions. Furthermore, by compliantly absorbing impacts, the compliant element 206 acts as a hardware safety feature that can prevent harm to humans or to the actuator itself.

In an embodiment, compliant element 206 includes a variable stiffness flexible membrane. The stiffness of the variable stiffness flexible membrane is adjustable by electrically energizing the variable stiffness flexible membrane. The variable stiffness flexible membrane is stiffer when unpowered. In an embodiment, a stiffness controller (not shown) is connected to the compliant element 206 and is configured to control the stiffness of the variable stiffness flexible membrane. The stiffness controller includes an electric power supply that, in an embodiment, provides a voltage to compliant electrodes that are disposed on either side of the variable stiffness flexible membrane. The stiffness controller may also include or be implemented as a data processing system for controlling the voltage applied to the compliant element 206. The electric motor controller and the stiffness controller may be included in the same data processing system. Varying the voltage across the variable stiffness flexible membrane causes the stiffness of the variable stiffness flexible membrane to change.

Figure 3:
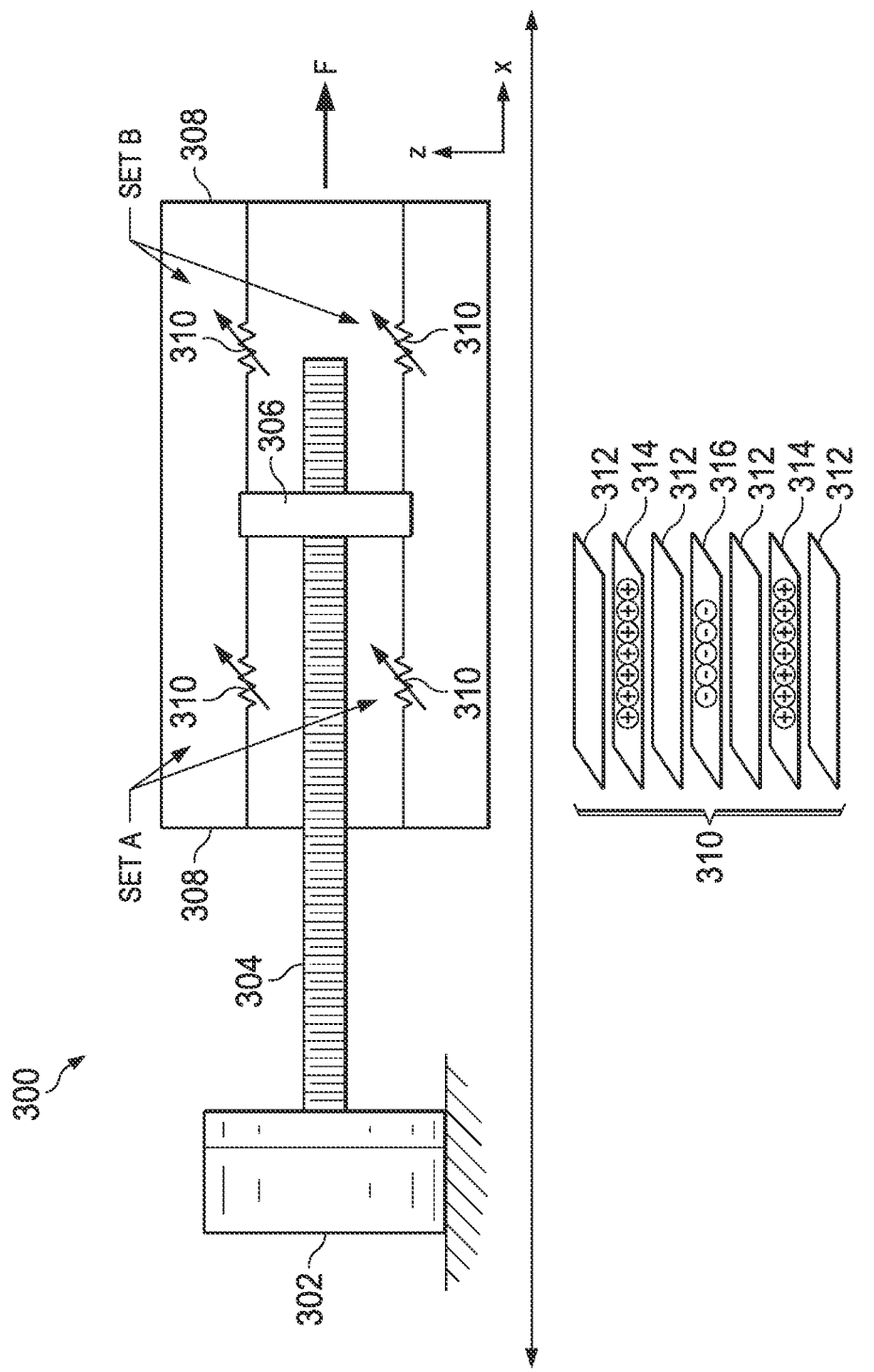
FIG. 3 is a schematic diagram of a DES VSA in accordance with an illustrative embodiment.
Figure 4:
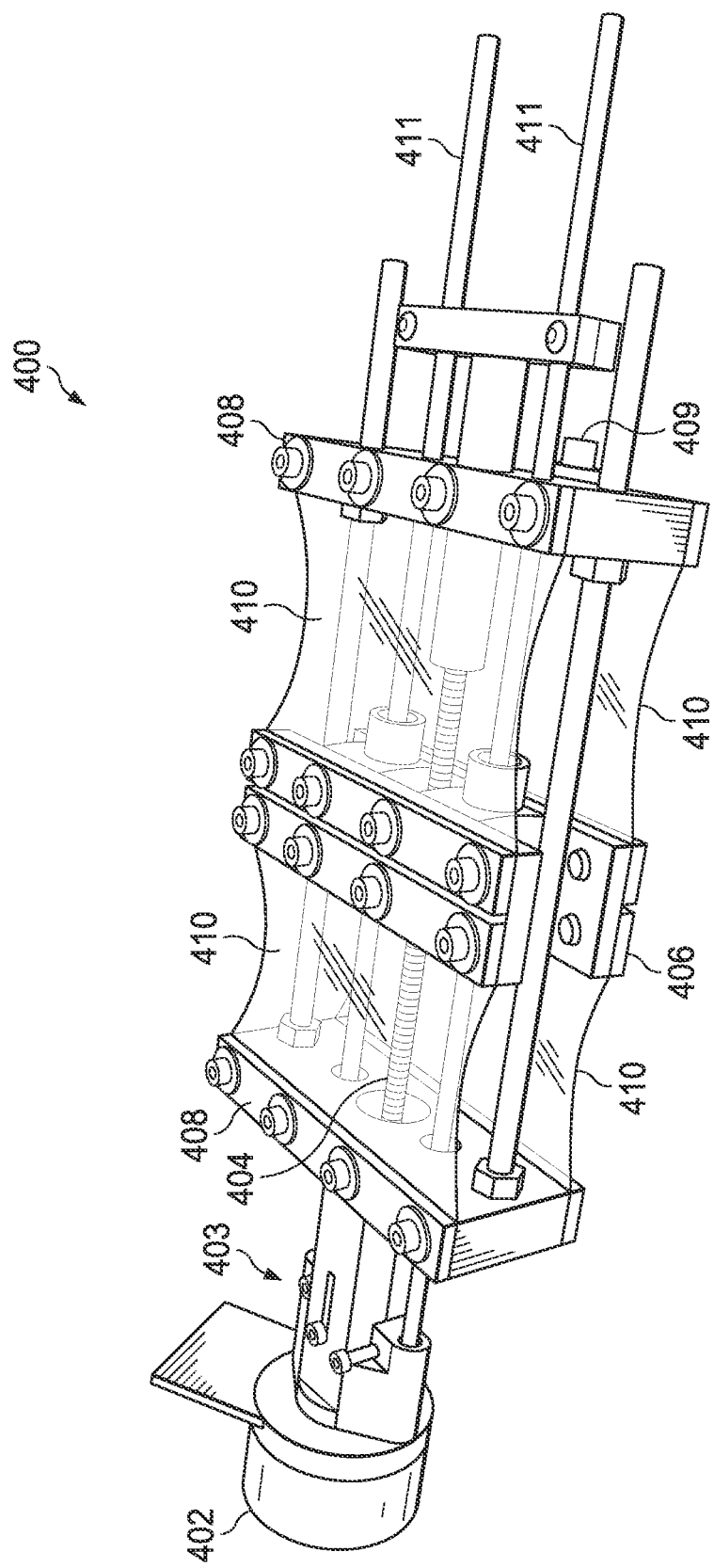
FIG. 4 is a perspective view of a DES VSA in accordance with an illustrative embodiment.

In one embodiment, the variable stiffness flexible membrane is oriented such that the plane of the membrane is parallel to a direction of force applied by the actuation motor to the load. FIGS. 3 and 4 and their description below provide more details regarding an illustrative example of this embodiment.

In another embodiment, the variable stiffness flexible membrane is oriented such that the plane of the membrane is perpendicular to a direction of force applied by the motor 202 to the load. Illustrative examples of this embodiment are shown in FIGS. 5, 6A, 6B, 7, 8A, and 8B and described below.

The motor 202 is configured to control an equilibrium length of the actuator 200.

FIG. 3 is a schematic diagram of a DES VSA 300 in accordance with an illustrative embodiment. DES VSA 300 is an example of a DES VSA 200 depicted in FIG. 2. DES VSA 300 includes an electric motor 302, a ball screw 304, an input block 306, an output block 308 and two sets of dielectric elastomer systems (DESs) 310 designated as set A and set B in FIG. 3. The DESs 310 are arranged in planes on either side of the ball screw. A first end of the DESs 310 of set A are connected to one end of the output block 308 and a second end of the DESs 310 of set A are connected to the input block 306. A first end of the DESs 310 of set B are connected to output block 308 at the end opposite from the end of the output block 308 to which the DESs 310 of set A are connected. A second end of the DESs 310 of set B are connected to the input block 306. The plane of the DESs 310 are planar sheets and the plane of each of the DESs 310 lie in a plane perpendicular to the z-axis as z-axis is defined in FIG. 3. In an embodiment, the input block 306 is an input clamp and the output block 308 is an output clamp.

In an embodiment, the DESs 310 include alternating layers of dielectric elastomer sheets 312 and positive compliant electrodes 314 and negative compliant electrodes 316. The compliant electrodes 314, 316 allow the flexibility of the dielectric elastomers 312 to be controlled and adjusted as needed.

The electric motor 302 drives the ball screw 304 causing the input block 306 to translate in the x-direction. The input block 306 is compliantly connected to the output block 308 through two sets of DESs 310 (depicted as springs). The load (F) is applied to the output block 308.

Variable stiffness mechanisms using conventional mechanical components tend to be complex and bulky. A dielectric elastomer system (DES) 310 is an alternative variable stiffness device that is mechanically simple and lightweight. A DES 310 consists of an elastomer 312, a rubbery polymer, sandwiched between compliant electrodes 314, 316 as shown in FIG. 3. When the electrodes 314, 316 are electrically charged (oppositely), they attract each other and cause a compressive force on the sandwiched elastomer 312 in the z-direction. Because of this compression, the elastomer 312 expands in the x- and y-directions. This expansive effect can be harnessed for actuation.

Charges on the electrodes 314, 316 also cause the stiffness of the DES 310 to change.

An equation that relates the change of stiffness to the applied voltage for a planar DES with one end fixed, a load applied to its opposite end, and its width constrained is:

$$k_{eff}=k_0-bV^2 \quad (1)$$

Eq. 1 says that the effective DES stiffness in the actuation direction, $k_{eff}$, is reduced from the stiffness of the uncharged device, $k_0$, by the square of the applied voltage, V, scaled by a constant, which is dependent on the elastomer's dimensions and electrical permittivity. In an embodiment, a DES VSA 300 with a DES 310 as its compliant element takes advantage of this effect so that the stiffness of the DES VSA 300 is modulated electrically.

A direct drive ball screw 304 provides "gear reduction" in a compact, lightweight package and converts the rotary motion of the motor 302 to linear motion that interfaces readily with the planar, dielectric elastomer sheets 312. Because of these benefits, in an embodiment, a ball screw was selected to connect the motor 302 to the dielectric elastomer sheets 312.

There are many possible mechanical configurations for the DES 310. Stack, bending beam, diaphragm, and tube are some of the common options. The selection of a particular configuration has a direct impact on the maximum strain, required voltage, force output, power density, and fabrication complexity of the device. In an embodiment, the DES VSA 300 uses rectangular DESs 310 stacked on each other. In this design, planar, dielectric elastomer sheets 312 are stacked in layers with electrodes 314, 316 between the elastomers 312 as shown in FIG. 3. The stacks are clamped at their ends that are parallel to the y-axis, and then the motion of the input and output blocks 306, 308 stretches and relaxes the sheets in the x-direction. Some benefits of this configuration are comparatively simple manufacturing, a simple mathematical model, and ease of attachment to other mechanical components.

The DES VSA 300 design uses four stacks of DESs 310 configured to act as parallel springs that are intended to be solely in tension during operation. These stacks are depicted schematically as springs in FIG. 3. The DESs 310 on the motor 302 end of the DES VSA 300 (set A) pull on the output block 308 in opposition, antagonistically, to the force from the DESs 310 on the output end of the DES VSA 300 (set B). When set A extends, set B contracts, and vice-versa.

One benefit of this configuration is that expansion of the DES 310 in the x-y plane does not alter the equilibrium position of the output block 308. A second benefit is that because the antagonistic configuration is designed to keep the sheets 312 in tension, the DES VSA 300 can use their elastic effects whether it receives a tension or compression load.

In an embodiment, the elastomer material for the elastomer sheets 312 is a urethane polymer with, for example, characteristics such as described below in Table I. Its high relative permittivity (14) and high dielectric breakdown strength (60V/μm) enable it to undergo large stiffness reductions. Its failure strain and elastic modulus are well suited for the DES VSA 300.

In an embodiment, the dimensions of the sheets used in the stack DES 310 configuration were constrained by several factors. First, the upper stiffness target constrained the overall geometry according to:

$$k = \frac{nzw}{l}Y, \qquad (2)$$

where k is the target stiffness value, n is the total number of sheets 312, z is the thickness of each sheet 312, w is the width of each sheet 312, and Y is the elastic modulus of the sheets 312. Second, in an embodiment, to minimize sheet manufacturing and actuator assembly time, the number of sheets 312, n, is minimized (sheet manufacturing can take days depending on the process). In an embodiment, the manufacturing process limited the maximum length and width of the sheets 312 to be either 10.2 cm or 9.2 cm. In order to minimize the actuation strain of the sheets 312, which is inversely proportional to their unstretched length, the sheet 312 length was set to the larger of these values (10.2 cm). The width was then chosen to be 9.2 cm in order to minimize n according to Eq. 2. Eq. 2 also suggests that z be maximized in order to reduce n, but increasing z also increases the voltage necessary to obtain the reduction between the upper and lower stiffness targets. Table I below summarizes the values selected for an embodiment of the DES VSA 300.

TABLE I

Dielectric Elastomer System Parameters

| Parameter | Value | Units |
|---|---|---|
| Young's Modulus | 2.5 | MPa |
| Max. Strain | 260 | % |
| Relative permittivity | 14 | — |
| Dielectric strength | 60 | V/μm |
| Dimensions | l × w × z (nominal) | |
| Individual Sheet | 114 × 92.2 × 0.2 | mm |
| Active Area | 63.5 × 92.2 × 0.2 | mm |

FIG. 4 is a perspective view of a DES VSA 400 in accordance with an illustrative embodiment. DES VSA 400 may be implemented as DES VSA 300 in FIG. 3. DES VSA 400 includes a motor 402, a motor mount 403, a ball screw 404, an input block 406, an output block 408, an output connection point 409, DESs 410, and guide rods 411. Motor 402 may be implemented as motor 302, ball screw 404 may be implemented as ball screw 304, input block 406 may be implemented as input block 306, output block 408 may be implemented as output block 308, and DESs 410 may be implemented as DES 310 depicted in FIG. 3 and described above.

The overall layout of the DES VSA 400 provides a compact device utilizing 1) a direct drive ball screw 404, 2) DESs 410, and 3) an antagonistic spring configuration. In an embodiment, the DES VSA 400 has a weight of 734 grams (g) and an overall length of 33 centimeters (cm). The mechanical arrangement is as follows. The motor mount 403 is fixed in place by a pin joint on the underside of the DES VSA 400. The motor mount 403 supports two guide rods 411 that serve as the backbone of the DES VSA 400. In an embodiment, screws hold the motor 402, implemented in an embodiment as a 70 W brushless DC motor (Maxon EC45 flat, P/N: 397172), to the motor mount 403, and a shaft coupler inside the motor mount 403 connects the motor 402 shaft to the end of the ball screw 404. The motor mount 403 holds a bearing assembly that supports the ball screw's axial load. The ball nut travels along the ball screw 404 as the ball screw 404 rotates, and the ball nut connects to the input block 406 through a pin joint. In an embodiment, the ball screw 404 has a lead of 2 mm. Four black carbon fiber plates bolted to the input block 406 clamp the inner ends of the DESs 410 in place. The outer ends of the DESs 410 are similarly clamped to the output block 408, and the two portions of the output block 408 are connected with long bolts and nuts. This connection makes it possible to adjust the prestrain of the DESs 410. The load attaches to the DES VSA 400 at the output connection point 409, which is a pin connection in an embodiment.

Deformation of a DES 410 changes its capacitance. This change can be measured and used to calculate the force output of the DES VSA 400. This process is similar to how the force output of a series elastic actuator (SEA) is obtained from Hooke's law and measurement of the SEA spring's displacement. However, the calculation for the DES VSA 400 is more complex because of the viscoelastic nature of the DESs 410.

Figure 5:
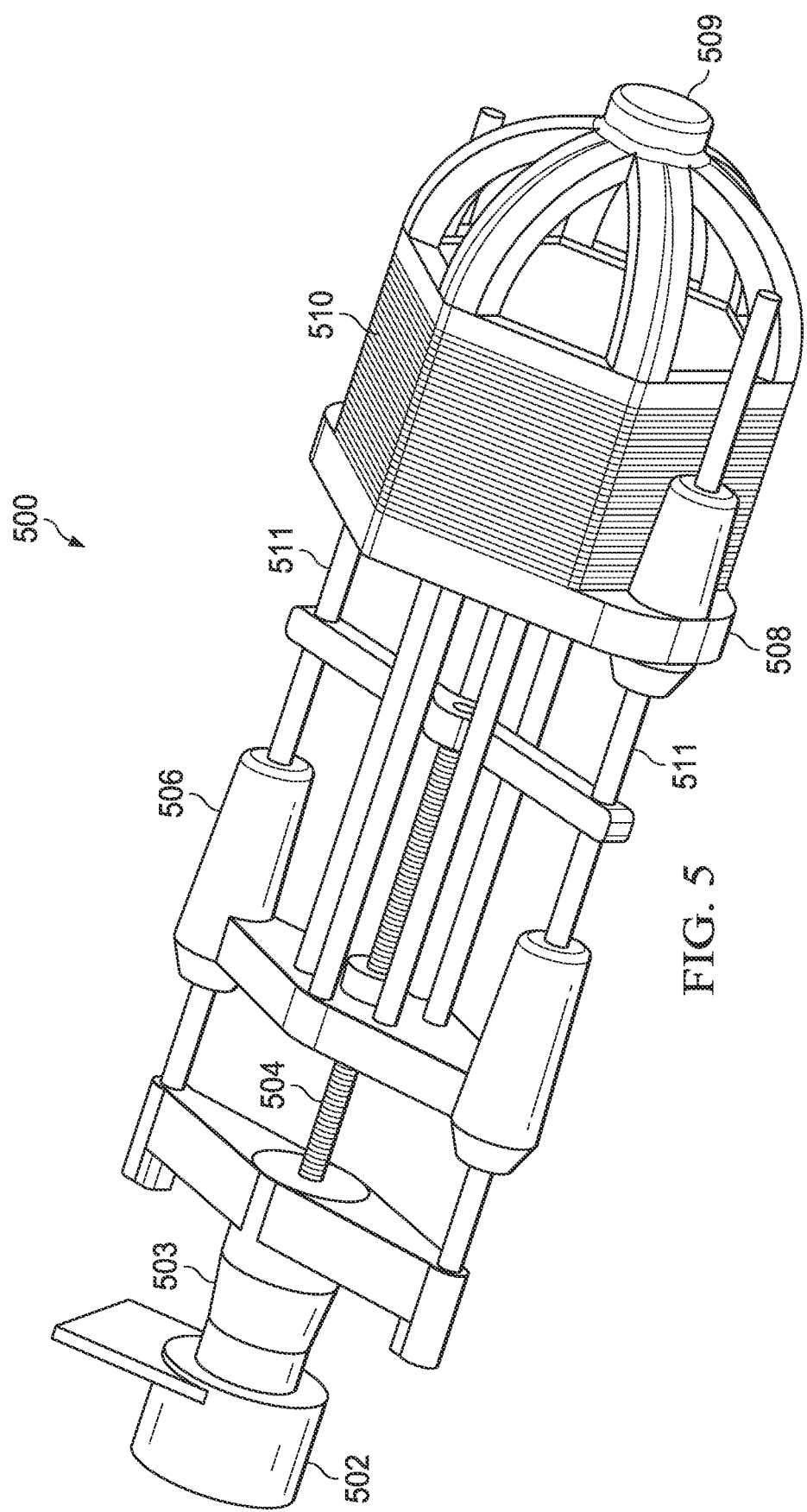
FIG. 5 is a perspective view of a DES VSA in accordance with an illustrative embodiment.

Turning now to FIG. 5, a perspective view of a DES VSA 500 is shown in accordance with an illustrative embodiment. DES VSA 500 may be implemented as SEA 200 depicted in FIG. 2. DES VSA 500 includes a motor 502, a motor mount 503, a ball screw 504, an input block 506, an output block 508, an output connection point 509, a plurality of DES diaphragm modules 510 that each include a DES sheet, and guide rods 511. The DES diaphragm modules 510 form a variable stiffness mechanism. In contrast to the configuration of DES VSAs 300 and 400 in which the DESs 310, 410 were oriented such that the primary plane of each sheet of DES 310, 410 was parallel to the direction of force applied by the motor 302, 402, the DES sheets on the DES diaphragm modules 510 are arranged in a stack such that the primary plane of each DES sheet of the DES diaphragm modules 510 is orthogonal to the direction of force applied by the motor 502.

Figure 6B:
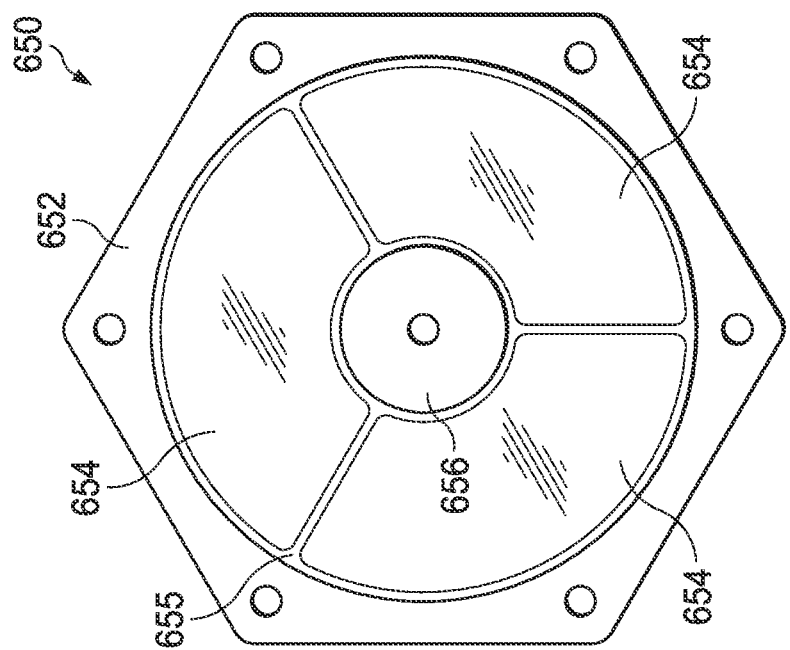
FIG. 6B is a diagram of an alternate DES module depicted in accordance with an illustrative embodiment.
Figure 6A:
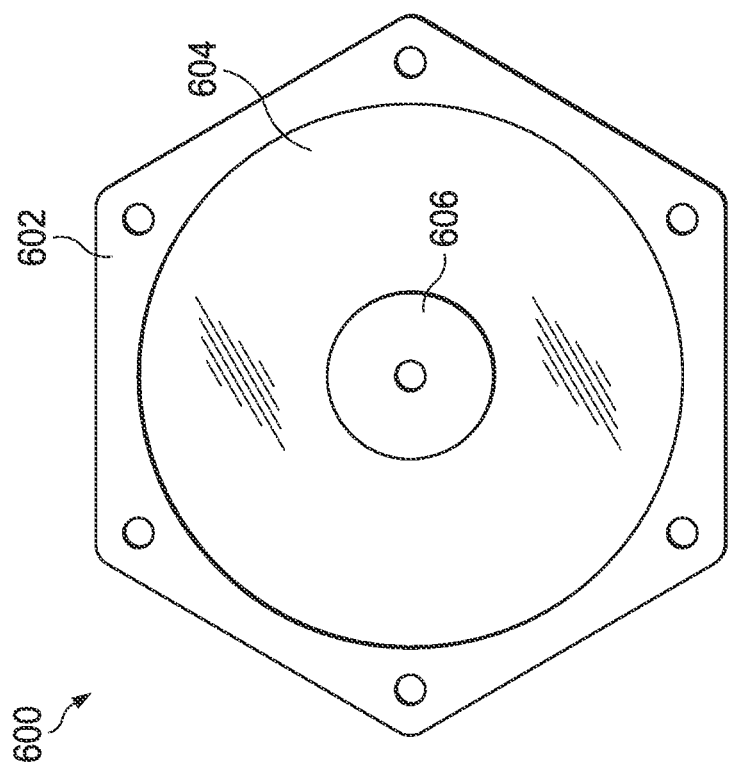
FIG. 6A is a diagram of a DES module depicted in accordance with an illustrative embodiment.

FIG. 6A is a diagram of a DES module 600 depicted in accordance with an illustrative embodiment. DES module 600 may be implemented as any of DES diaphragm modules 510 depicted in FIG. 5. DES module 600 includes an outer frame 602, an inner frame member 606, and DES 604. Although depicted as a substantially circular disk or cylindrical disk, the DES 604 and the inner frame member 606 may be fabricated into other shapes in other embodiments.

The outer frame 602 is depicted as a hexagonal shape, but it may take the form of other shapes in other embodiments. In an embodiment, the DES 604 includes a dielectric elastomer layer, a first compliant electrode layer covering a first surface of the elastomer layer, and a second compliant electrode layer covering a second surface of the elastomer layer. The first and second compliant electrode layers are configured to provide a voltage difference across a plane of the dielectric elastomer layer, wherein an increasing voltage difference causes an increase in softening of the DES.

FIG. 6B is a diagram of an alternate DES module 650 depicted in accordance with an illustrative embodiment. DES module 650 may be implemented as any of DES diaphragm modules 510 depicted in FIG. 5. DES module 650 includes an inner frame member 656 and an outer frame 652 connected to the inner frame member 656 by a DES membrane 655 having segmented electrodes 654. By including segmented electrodes, this configuration adds additional actuation degrees of freedom. The inner frame member 656 can be translated within the plane of the module by selectively charging only a portion of the electrodes. DES module 650 is similar to DES module 600 except that the electrodes 654 are segmented rather than being a single electrode covering the entire active area.

The design of the disclosed DES VSA 500 and DES module 600 allows independent control of stiffness and equilibrium position, unlike any other DES VSA. Thus, in an embodiment, the DES VSA 500 is configured such that an applied stiffness of the DES diaphragm module 510 is independent of a force applied to the DES diaphragm module 510. The DES VSA 500 is designed to be a linear actuator to fit the linear motion of DES diaphragm modules. To create linear motion, a direct drive ball screw 504 converts the rotation and torque of the actuation motor 502 (in an embodiment, the motor 502 is implemented as a Maxon EC45 Flat, 70 W) into displacement and force applied to the variable stiffness mechanism. In this arrangement, the actuation motor 502 sets the equilibrium position of the DES VSA 500 and supplies the force to maintain that position. The variable stiffness mechanism controls the actuator's stiffness and transmits the force to the load. A linear-bearing guide-rod 511 system serves as the backbone of the actuator maintaining its components in alignment. In an embodiment, the linear-bearing guide-rod system 511 is configured to constrain an output point of the DES VSA 500 to linear motion. In an embodiment, the DES VSA 500 is mounted with two pin joints, one on its motor mount 503, and the other at the output point 509. In an embodiment, the DES VSA 500 has a mass of 880g and is 45 cm long at maximum extension. In an embodiment, the DES VSA's 500 output point 509 can travel 90 millimeters (mm), and the DES VSA's 500 equilibrium position travel is 42 mm. In an embodiment, the variable stiffness mechanism can deflect up to 25 mm in either direction within the DES VSA's 500 range of travel. In an embodiment, the DES VSAs 500 width is 134 mm, and its height is 108 mm.

Returning to FIG. 6A, The DES diaphragm modules 600, which form the disclosed DES VSA's 500 variable stiffness mechanism in FIG. 5, are simple mechanisms. In an embodiment, in each module 600, a thin, pre-stretched, adhesive, dielectric elastomer layer 604 (elastomer layer 604 may be implemented as, for example, VHB 4910) connects the inner frame member 606 to the outer frame 602. The elastomer layer 604 is coated on its top and bottom faces with conductive graphite powder, which forms the electrodes of the DES 600. In an embodiment, the electrodes of the DES 600 are compliant electrode layers. Polyimide film lines the edges of the elastomer layer 604, reinforcing them against the electrical field and mechanical stress concentrations that occur there. During operation, the inner frame member 606 displace out of plane, like the motion of the center of a speaker cone, stretching the DES 604. When a high-voltage (in an embodiment, over 1000 Volts) charge is applied to its electrodes, the DES 604 softens and relaxes its pretension softening the module. Removing the charge stiffens the module 600. Electrically, a module 600 acts like a capacitor, and its capacitance increases when its inner frame member 606 is displaced out of plane.

Figure 7:
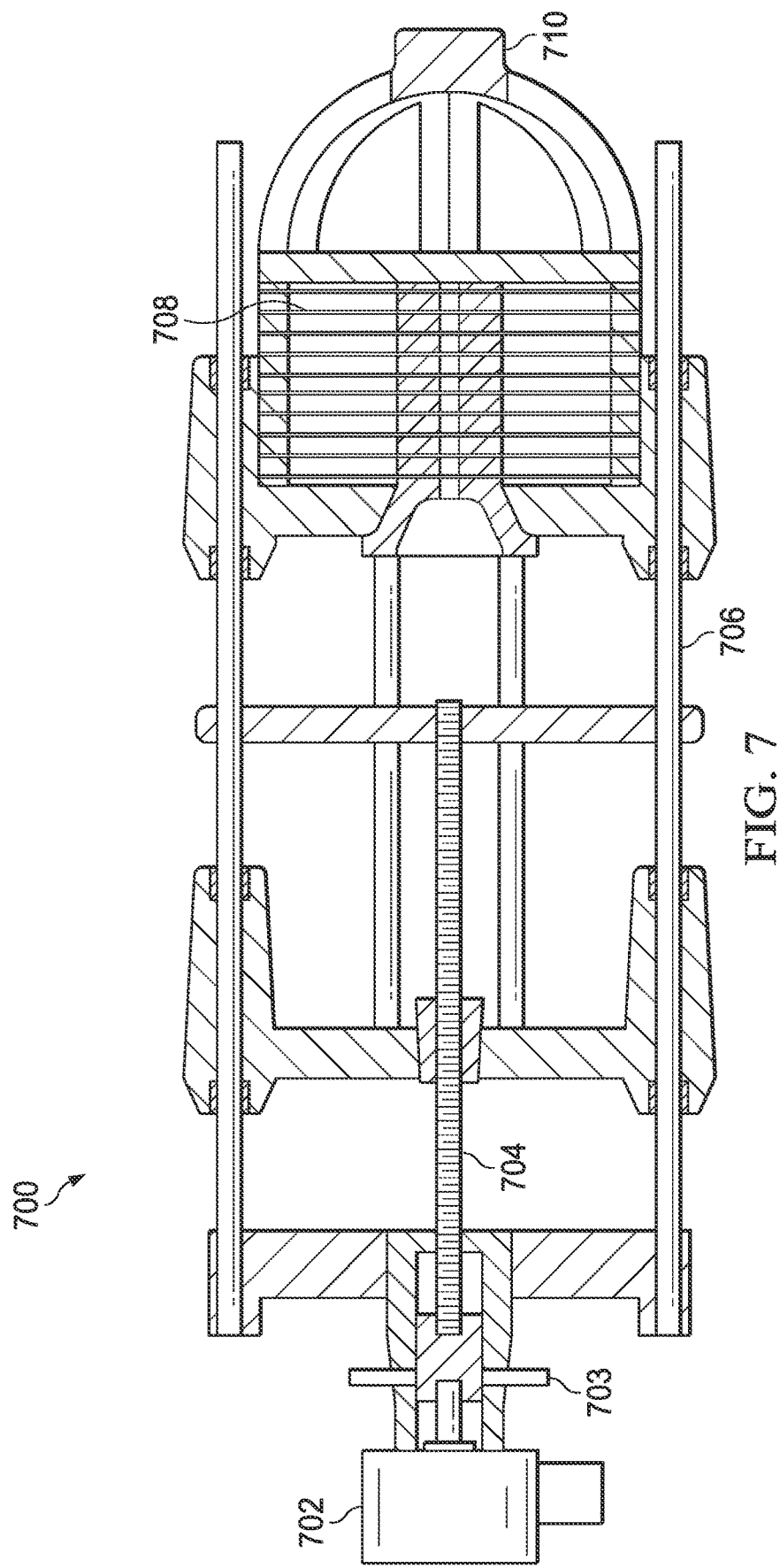
FIG. 7 is a cross-section view of a DES VSA in accordance with an illustrative embodiment.

Turning now to FIG. 7, a cross-section view of a DES VSA 700 is depicted in accordance with an illustrative embodiment. DES VSA 700 may be implemented as, for example, DES VSA 500 depicted in FIG. 5. DES VSA 700 is an example of a DES VSA such as DES VSA 200 depicted in FIG. 2.

DES VSA 700 includes an actuation motor 702, a pin joint 703, a ball screw 704, a linear-bearing guide rod system 706, a variable stiffness mechanism 708, and an output point 710. The variable stiffness mechanism 708 includes one or more DES modules described in more detail below with reference to FIGS. 8A and 8B. The DES VSA 700 also includes a stiffness controller (not shown). The stiffness controller includes a power supply and is configured to apply a voltage across a variable stiffness dielectric elastomer membrane. The amount of voltage controls determines the amount of softening (i.e., increasing flexibility) of the DES. More voltage results in more softening. No applied voltage results in the DES stiffening. Thus, the stiffness of the DES is controlled by varying a control voltage applied to the DES. In an embodiment, the stiffness controller is configured to control the stiffness of the DES such that the stiffness of the DES is at a maximum stiffness when the DES is unpowered. In an embodiment, the stiffness controller controls the stiffness of the DES without the aid of the actuation motor 702 and without the aid of any other motor. In an embodiment, the DES is configured to measure the force output of the actuation motor with an additional position sensor, but without any force sensors.

The actuation motor 702 is mechanically coupled to the ball screw 704 and is configured to cause a force to be applied to an inner frame member of the flexible membrane via the ball screw 704. An example of an inner frame member is center disk 806 depicted in FIG. 8 and described below. The actuation motor 702 is also configured to control an equilibrium length of the DES VSA 700.

In some embodiments, the DES VSA 700 is connected to a data processing system, such as, for example, data processing system 1200 shown in FIG. 12 and described below. The data processing system may control actuation motor 702 and the stiffness controller, thereby controlling the operation of the DES VSA 700.

FIG. 8 is a cross-sectional view of a DES module 800 that is depicted in accordance with an illustrative embodiment. DES module 800 may be implemented as DES module 600 depicted in FIG. 6. DES module 800 may be incorporated into the variable stiffness mechanism 708 of the DES VSA 700 depicted in FIG. 7. The DES module 800 includes an outer frame 802, a DES flexible sheet 804, and a center disk 806. The center disk 806 and the outer frame 802 may be constructed from a plastic such as ABS plastic. Other stiff materials can be used if they are not electrically conductive. In other embodiments, the center disk 806 and the outer frame 802 may be constructed from an electrically conductive material if additional insulating components are used to electrically insulate the center disk 806 and the outer frame 802 from the flexible sheet 804. In some embodiments, the center disk 806 is not placed in the center of the flexible sheet 804. In some embodiments, the center disk 806 is replaced by another inner frame member that has a shape other than circular or disk like.

The DES flexible sheet 804 includes a dielectric elastomer 808. The DES flexible sheet 804 also includes compliant electrodes 810 surrounding at least a portion of either side of the DE sheet 808. Additionally, the DES flexible sheet 804 includes a polyimide sheet 812 disposed between a portion of the DE sheet 808 and one of the compliant electrodes 810. The polyimide provides mechanical and electrical protection to the DE sheet 808. In an embodiment, the DE sheet 808 may include silicone or an acrylic elastomer. In an embodiment, the DE sheet 808 may include fluorosilicones, polyurethanes, or natural rubbers. In some embodiments, silicone may be preferred since silicones typically have much less viscosity than the acrylic elastomers. In an embodiment, the acrylic elastomer is Very High Bond (VHB) 4905 or VHB 4910, both available from 3M. For use in a DES VSA, in an embodiment, an elastomer should have a large strain capacity, a high relative permittivity, and a high breakdown field. Additionally, in an embodiment, low viscosity is often desirable.

The center disk 806 may displace out of plane as shown in FIG. 8. In an embodiment, the thickness of the outer frame 802 is around 1.9 mm, a diameter of the center disk 806 is about 25.4 mm, and a diameter of the outer frame is about 82.6 mm. In an embodiment, the polyimide sheet 812 extends away from the outer frame 802 towards the center disk 806 by about 2.54 mm. In an embodiment, the polyimide sheet 812 also extends away from the center disk 806 toward the outer frame 802 by about 2.54 mm. The polyimide sheet 812 does not extend all the way from the outer frame 802 to the center disk 806.

In an embodiment, the variable stiffness mechanism 708 includes of a stack of thirty DES modules 800 capped on the ends by two insulating modules. The DES modules 800 are variable stiffness modules. In other embodiments, the number of DES modules 800 may be more or less than thirty. In an embodiment, the stack of DES modules 800 is arranged in a stack structure such that they form a system of mechanically parallel springs. In other embodiments, the variable stiffness mechanism 708 includes a number of DES modules 800, where a number is one or more. The variable stiffness mechanism 708 has no rolling or sliding components, so it is mechanically simple. Electrically, the DES modules 800 are connected in parallel, so they all charge and discharge together. The modules' 800 center disks 806 are connected to the DES VSA's ball screw 704, and the module frames 802 are connected to the actuator's output point 710 as shown in FIG. 7. Thus, the DES modules 800 add their force together when stretched, so they are mechanically parallel springs.

The coupling between a DES VSA's 700 stiffness and its equilibrium position can be evaluated by fixing the DES VSA's 700 equilibrium position and then perturbing the DES VSA's 700 output point with a range of stiffness settings and repeating for additional equilibrium positions.

Figure 9:
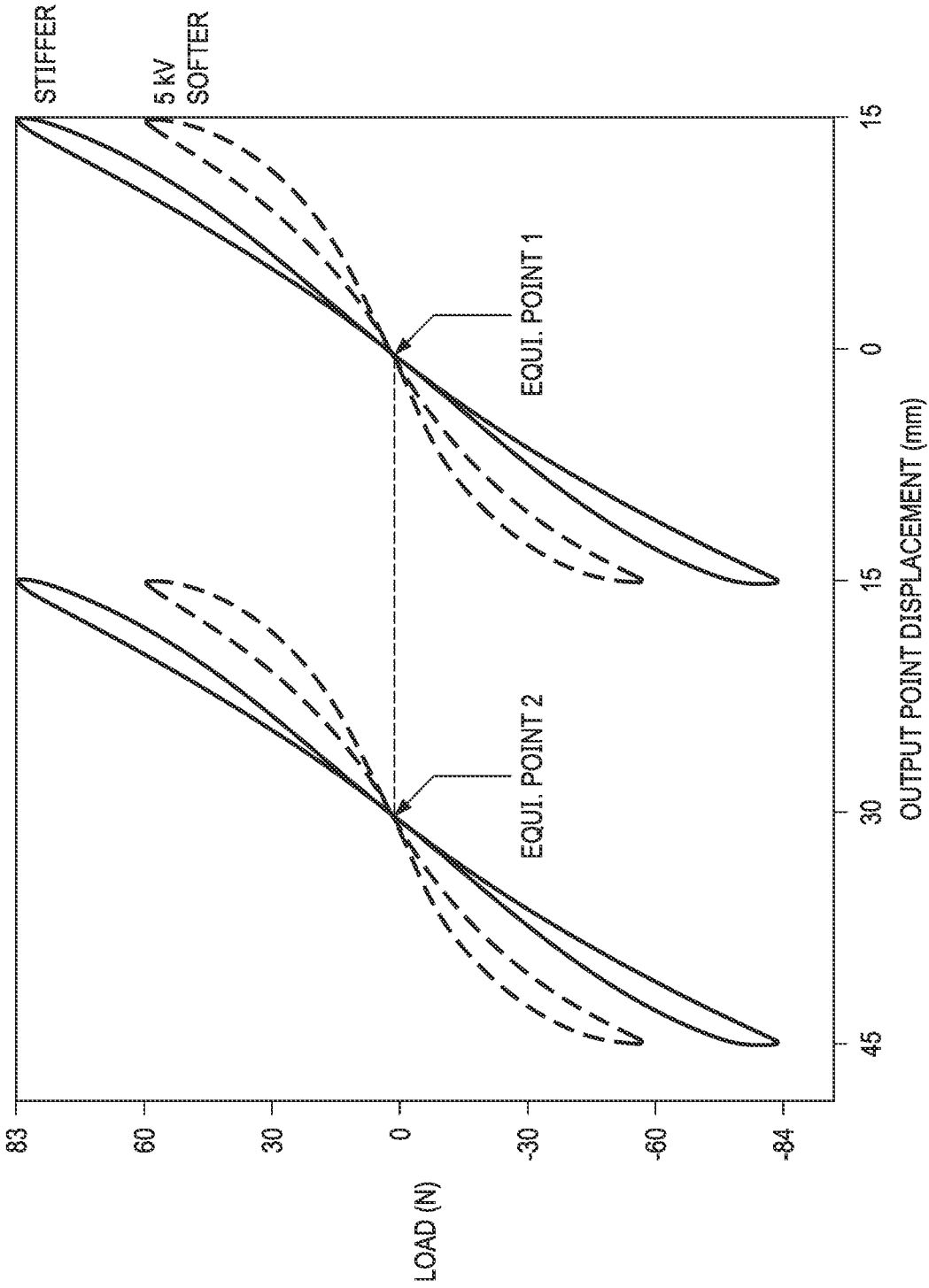
FIG. 9 is a plot of a VSA signature showing independent modulation of stiffness and equilibrium position, according to test results obtained from an illustrative embodiment of the DES VSA.

FIG. 9 is a plot of a VSA signature showing independent modulation of stiffness and equilibrium position, according to test results obtained from an illustrative embodiment of the DES VSA. This plot 900 of the load applied to the DES VSA 500 and its output point displacement can be regarded as its signature.

The plot 900 shown in FIG. 9 of the reaction force and output point displacement resulting from these perturbations of an embodiment DES VSA 700 shows the range of stiffnesses the DES VSA 700 can reach at each equilibrium setting and can be regarded as the DES VSA's signature. The stiffnesses of a DES VSA appear in its signature as the slope of the non-zero force portions of the force-displacement trajectories, and the equilibrium points appear as displacement values where force is zero.

One signature of DES VSA 500 has a pair of stiffer and softer trajectories that originate from equilibrium (Equi.) point 1 at 0 mm. The stiffer curve was generated with DES VSA's 500 variable stiffness mechanism discharged, and the softer curve with the mechanism charged to 5.0 kV. This feature of the signature shows that the DES VSA 500 can modulate its stiffness. The mechanism can also have intermediate stiffness values, but we omitted them here so as not to clutter the plot. The VSA signature of the disclosed DES VSA 500 has a range of zero-force points between equilibrium points 1 and 2 that was generated by shifting the DES VSA's 500 equilibrium point. This feature shows that the DES VSA 500 can control its equilibrium point, making it an actuator. Finally, the signature has another pair of stiff and soft force-displacement trajectories that originate from equilibrium point 2. These curves are identical to those originating from equilibrium point 1, so the signature shows that the DES VSA 500 can reach its full range of stiffnesses across its range of equilibrium positions. Therefore, our DES VSA 500 can modulate its stiffness and equilibrium position independently.

FIGS. 10A, 10B, and 10C show plots 1002, 1004, 1006 of tensile test results showing the stiffness change of an embodiment of the DES VSA. When the variable stiffness mechanism is charged with a constant voltage, it softens as can be seen from these test results. In these tests, the equilibrium position of the DES VSA is constant, and the variable stiffness mechanism is displaced at a constant speed of (A) 1 mm/s, (B) 10 mm/s, or (C) 100 mm/s. The displacement of the variable stiffness mechanism is on the horizontal axis, while the load applied is on the vertical axis. Both are linearly scaled. The peak forces are marked on the vertical axis. Notice also that the variable stiffness mechanism exerted more force during high speed motion due to the viscoelasticity of the dielectric elastomer material in the DES modules.

The variable stiffness mechanism softens up to 52% shown in Table II below when charged to 5.0 kV, according to a series of tensile tests 1002, 1004, 1006 shown in FIGS. 10A, 10B, and 10C. Its force-displacement relationship for a constant applied voltage is nonlinear, so its stiffness is a function of its displacement. The mechanism's stiffness reduces most at small deflections, 52% for the 0-5 mm interval. At larger deflections, the stiffness reduction diminishes, and stiffness increases by 2.5% for the 20-25 mm interval. Noise in the data makes numerical differentiation of the force-displacement curves using neighboring data points inaccurate, so we calculated an average stiffness for 5 mm intervals from the force and displacement values at the endpoints of those intervals. The data in Table II was calculated from the portion of the 1 mm/s trajectories that correspond to extension (moving away from equilibrium) and tension (positive force in FIGS. 10A, 10B, and 10C). We chose this portion of the data because it is the least influenced by the viscosity of the modules and friction from the testbed. Only data for 0 kV and 5 kV is reported in FIGS. 10A, 10B, and 10C so as not to clutter the plots 1002, 1004, 1006. However, intermediate stiffness reductions were also obtained when the variable stiffness mechanism was charged to 2 kV and 4 kV as seen in plot 1100 in FIG. 11.

TABLE II

Stiffness Change for During Tensile Test at
1 mm/s, and % Change Relative to 0-kV Stiffness

| Displacement | Average Stiffness (N/mm) | | | | % change of stiffness | | |
|---|---|---|---|---|---|---|---|
| Interval (mm) | 0 kV | 2 kV | 4 kV | 5 kV | 2 kV | 4 kV | 5 kV |
| 0-5   | 4.42 | 3.77 | 2.86 | 2.10 | -14.5 | -35.1 | -52.4 |
| 5-10  | 4.93 | 4.62 | 3.56 | 2.72 | -6.3  | -27.8 | -44.8 |
| 10-15 | 5.26 | 5.25 | 4.68 | 4.35 | -0.2  | -11.0 | -17.4 |
| 15-20 | 6.59 | 6.23 | 5.96 | 6.05 | -5.5  | -9.5  | -8.1  |
| 10-25 | 7.89 | 7.86 | 7.99 | 8.09 | -0.4  | 1.3   | 2.5   |

Repeating the tensile tests at higher speeds showed the effects of viscoelasticity in the variable stiffness mechanism. FIG. 10B and FIG. 10C show that the force output and hysteresis of the variable stiffness mechanism increase when it is displaced more rapidly. The viscoelasticity of the dielectric elastomer used in the DES modules explains these two effects because viscosity damps motion.

According to the tensile test data, an embodiment of the disclosed DES VSA could supply a steady force of 140N without exceeding the displacement limits of its variable stiffness mechanism. Due to the viscoelasticity of the DES modules, an embodiment of the disclosed DES VSA can briefly sustain loads greater than 140N, but such loads will overextend the variable stiffness mechanism and may damage it if applied too long. The value of 140N is the force value at the start of retraction (moving towards equilibrium) during the tension half-cycle for the 1 mm/s tensile test (FIG. 10A). Viscous damping caused force to reach 150N during extension of the variable stiffness mechanism, but this force dropped to 140N while the mechanism remained at maximum displacement. Compression makes the DES VSA and load actuator system tend to buckle, so it is believed that the additional force magnitude during compression is caused by friction from the supports that resist buckling. The DES modules are essentially symmetric with respect to the resting plane of their diaphragms (FIG. 8), so they should exert the same force magnitude for either displacement direction and should not cause the additional compression force.

Integration of the force-displacement curves in FIGS. 10A, 10B, and 10C yields the mechanical energy absorbed or returned by the variable stiffness mechanism shown in Table III below. For the 1 mm/s trial at 0 kV, the variable stiffness mechanism absorbed 1.67 J, storing a portion elastically and viscously dissipating the rest, and returned 1.46 J of mechanical energy. Since this trial was quasistatic, minimizing viscous losses, these values approximate the lower bound for energy absorbed and upper bound for energy returned when the variable stiffness mechanism is at its stiffest setting. When the variable stiffness mechanism was displaced more rapidly, it absorbed more energy while stretching and voltage the variable stiffness mechanism was charged to, and the displacement applied to it. Both energy and power increase as voltage or displacement increases. At most, the mechanism returned less energy while returning to equilibrium as seen in the data from the 10 mm/s and 100 mm/s trials at 0 kV.

TABLE III

The Electrical Energy Required to Reduce Stiffness
and the Power Required to Hold the Reduced Stiffness

| VSM Disp. | Energy (J) | | | Power (mW) | | | |
|---|---|---|---|---|---|---|---|
| (mm) | 2.0 | 4.0 | 5.0 | 2.0 | 4.0 | 5.0 | |
| 5  | 0.182 | 0.734 | 1.159 | 39 | 164 | 262 | kV, VSM |
| 10 | 0.222 | 0.799 | 1.230 | 40 | 161 | 267 | voltage |
| 20 | 0.327 | 1.253 | 1.764 | 46 | 173 | 305 | |
| 25 | 0.468 | 1.494 | 2.022 | 54 | 173 | 324 | |

Figure 11:
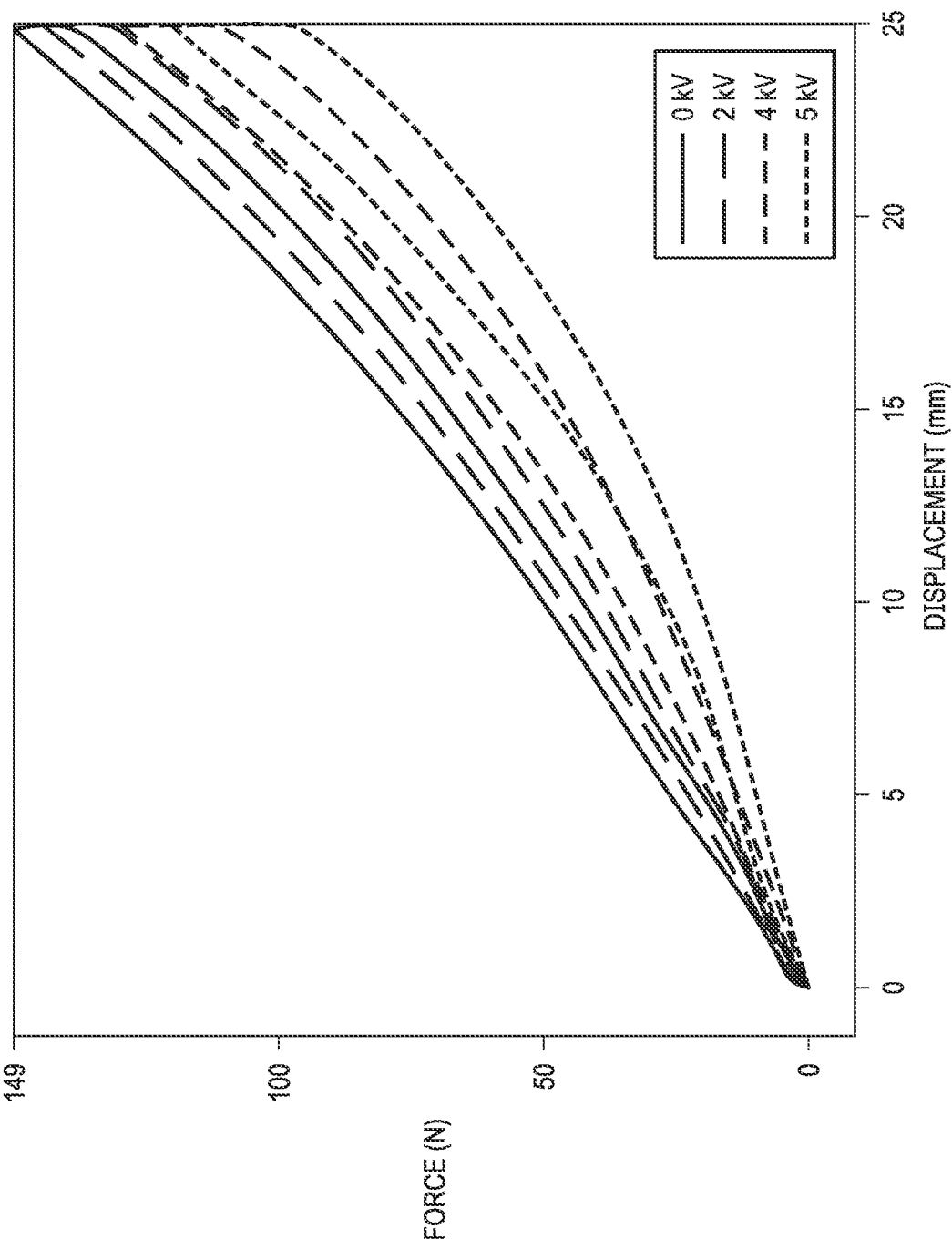
FIG. 11 shows a plot of tensile test results for multiple voltages.

FIG. 11 shows a plot 1100 of tensile test results for multiple voltages. These plots show that intermediate voltages between 0 kV and 5 kV produce intermediate stiffnesses. As for the results in FIG. 10A, the variable stiffness mechanism was displaced at 1 mm/s from -25 mm to 25 mm. However, only the tension portion is shown here so that the results can be seen clearly.

The mechanical simplicity that the disclosed embodiments provide is an attractive design feature. Because the motion in the DES modules occurs through stretching instead of rolling or sliding, the DES variable stiffness mechanism does not need bearings or bushings, which can wear out. Further, the mechanism does not need complex and costly machining. In an embodiment, assembly of the DES modules includes merely 3D printing, laser cutting, and hand assembly.

Despite the mechanical simplicity of its variable stiffness mechanism, the functionality of the disclosed DES VSA matches that of state-of-the-art VSAs. In an embodiment, the VSA signature of the disclosed DES VSAs displayed independent control of stiffness and equilibrium position, and the DES VSA sustained 140N of steady load, a feature combination that no prior DES VSA can match. In an embodiment, the energy absorption (≥1.67 J) and return (≤1.46 J) capacity of the disclosed DES VSA's variable stiffness mechanism falls within the range achieved by state-of-the-art VSAs, 0.19 J to 8.5 J for example. An embodiment of the disclosed DES VSA achieved a 52% stiffness reduction for extensions up to 5 mm, which is less than the "infinite" stiffness variation some VSA's are capable of. However, other work has shown that DESs can achieve zero stiffness for certain ranges of motion. Due to lack of published data, it is difficult to compare the power the disclosed DES VSA requires to hold reduced stiffness to the state of the art. However, the range of power measured (324-39 mW) is two to three orders of magnitude less than the VSA's actuation motor rating (70 W), which implies that stiffness holding may not greatly affect the actuator's overall power consumption. Because a single DES module softened in 27 ms, it is inferred that the DES VSA could soften in as little as 27 ms with a sufficiently powerful high voltage power supply. This performance would be on par with that of antagonistic VSAs and exceed that typical of VSAs with dedicated stiffness modulation motors.

The stiffness changing behavior of the disclosed DES VSAs is unlike that of any state-of-the-art VSA. When stiffening under load, state-of-the-art VSAs do positive work on their springs, so they require energy to stiffen. When softening under load, they do negative work on their springs and may recover energy from them. Therefore, they are "default-soft" VSAs. In contrast, the disclosed DES VSA is "default-stiff" because it requires energy to soften and may recover electrical energy from its DES modules when it stiffens. Default-stiff behavior could be an advantage for certain applications. Robotic prostheses and orthoses for legs should default to stiff settings when they lose power to maintain support for their wearer. They may also need to maintain stiff settings for long periods when their wearer is standing still, which could be energetically costly for a default-soft VSA, since doing so implies stalling a motor (or activating a clutch, which most VSAs do not have), but could require little or no stiffness modulation power for a default stiff VSA. Broadly, an application that requires a VSA to be stiff much more often than soft would tend to benefit from a default-stiff VSA.

In one illustrative example, one or more technical solutions are present that overcome technical problems with the weight, complexity, and default flexible when unenergized of prior art VSAs. As a result, one or more technical solutions may provide a technical effect of a DES VSA that defaults to default stiff when unenergized. The disclosed DES VSAs are also mechanically simpler than prior art VSAs.

The illustration of the DES VSAs and DES modules in the FIGS. 2-9 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 12:
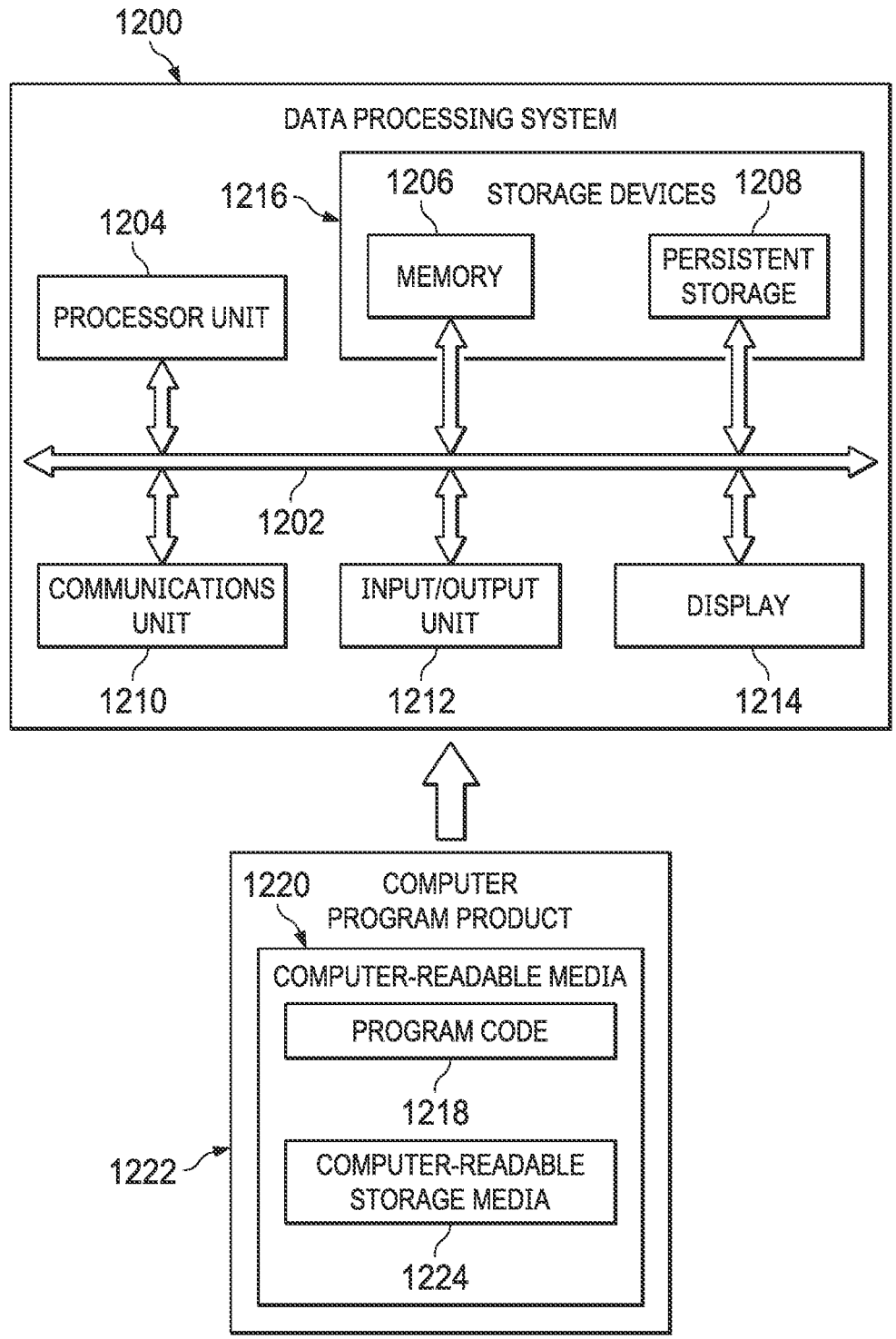
FIG. 12 is a block diagram of a data processing system in accordance with an illustrative embodiment.

Turning now to FIG. 12, a block diagram of a data processing system is depicted in accordance with an illustrative embodiment. Data processing system 1200 may be implemented to control the motors or stiffness of the DESs in the DES VSA 200 depicted in FIG. 2, DES VSA 300 depicted in FIG. 3, DES VSA 400 depicted in FIG. 4, DES VSA 500 depicted in FIG. 5, or DES VSA 700 in FIG. 7. Data processing system 1200 may be implemented as an electric motor controller and/or as a stiffness controller. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid-state drive (SSD), a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

The descriptions of the various embodiments of the present invention have been presented for purposes of illustration, but are not intended to be exhaustive or limited

What is claimed is:

1. A variable stiffness actuator (VSA) comprising:
an input block and an output block;
a dielectric elastomer system (DES) membrane positioned between the input block and the output block, the DES membrane configured to soften when energized and stiffen when not energized; and
an actuation motor mechanically coupled to the input block, the actuation motor configured to move the input block to deform the DES membrane.

2. The VSA of claim 1, further including a stiffness controller coupled to the DES membrane, the stiffness controller configured to adjust a stiffness of the DES membrane by varying a control voltage applied thereto.

3. The VSA of claim 2, wherein the stiffness of the DES membrane is at a maximum stiffness level when not energized.

4. The VSA of claim 2, wherein the stiffness of the DES membrane is controlled without aid of a motor.

5. The VSA of claim 1, wherein a force output of the actuation motor is measured without separate force sensors.

6. The VSA of claim 1, further including a ball screw coupled between the actuation motor and the input block, wherein the actuation motor is configured to drive the ball screw thereby applying a force to the input block.

7. The VSA of claim 6, further including an output point connected to the output block, the output point configured to connect the VSA to a load.

8. The VSA of claim 1, further including a linear-bearing guide-rod system connected to a mount of the actuation motor and configured to constrain an output point of the VSA to linear motion.

9. The VSA of claim 1, further including a stiffness controller coupled to the membrane, the stiffness controller configured to adjust a stiffness of the DES membrane by varying a control voltage applied thereto, wherein the actuation motor, the DES membrane, and the stiffness controller are configured such that the equilibrium position of the DES membrane and the stiffness of the DES membrane are independently controllable.

10. The VSA of claim 1, wherein an applied stiffness of the DES membrane is independent of an applied force to the DES membrane.

11. The VSA of claim 1, wherein the DES membrane comprises an elastomer layer, a first compliant electrode layer covering a first surface of the elastomer layer, and a second compliant electrode layer covering a second surface of the elastomer layer, the first and second compliant electrode layers configured to provide a voltage difference across a plane of the elastomer layer, wherein an increasing voltage difference causes an increase in softening of the elastomer layer.

12. The VSA of claim 1, further comprising:
a second DES membrane connected to the input block.

13. The VSA of claim 12, wherein the DES membrane and the second DES membrane are arranged in a stacked structure such that they form a system of mechanically parallel springs.

14. The VSA of claim 12, wherein the DES membrane and the second DES membrane are electrically coupled to a stiffness controller in parallel such that the DES membrane and the second DES membrane charge and discharge together.

15. The VSA of claim 1, wherein the DES membrane comprises one of an acrylic elastomer, silicone, a fluorosilicone, a polyurethane, and a natural rubber.

16. The VSA of claim 1, wherein the DES membrane comprises Very High Bond (VHB) 4910.

17. The VSA of claim 1, wherein the DES membrane is coupled between an inner frame and an outer frame, and further wherein the inner frame is situated substantially in a center of the outer frame.

18. The VSA of claim 17, wherein the inner frame comprises a substantially circular disk.

19. The VSA of claim 1, further including a polyimide film lining edges of the DES membrane, thereby reinforcing the DES membrane against an electrical field and mechanical stress concentrations that occur near the edges of the DES membrane.

20. A variable stiffness actuator (VSA) comprising:
a dielectric elastomer system (DES) membrane positioned between an input block and an output block, the DES membrane configured to soften when energized and stiffen when not energized;
a stiffness controller connected to the DES membrane and configured to control the stiffness of the DES membrane;
an actuation motor mechanically coupled to the DES membrane and configured to control an equilibrium position of the VSA, the actuation motor configured to move in a direction to deform the DES membrane; and
a connector connecting the DES membrane to a load.

21. The VSA of claim 20, wherein the DES membrane is oriented such that a plane of the DES membrane is parallel to a direction of force applied by the actuation motor to the load.

22. The VSA of claim 20, wherein the DES membrane is oriented such that a plane of the DES membrane is perpendicular to a direction of force applied by the actuation motor to the load.

23. A variable stiffness actuator (VSA) comprising:
a plurality of dielectric elastomer system (DES) membranes, wherein a first side of each of the DES membranes is at least partially covered by a first compliant electrode, wherein a second side of each of the DES membranes is at least partially covered by a second compliant electrode, and wherein each of the plurality of DES membranes is configured to soften when energized with an electric field applied via the first and second compliant electrodes and to become stiffer when unenergized;
a stiffness controller connected to the plurality of DES membranes, the stiffness controller configured to control a stiffness of the DES membranes via application of a control voltage thereto;
a ball screw;
an actuator coupled to the ball screw, the actuator configured to adjust an equilibrium position of the VSA;
an input block configured to mechanically couple the ball screw to first ends of the plurality of DES membranes;
an output block configured to mechanically couple second ends of the plurality of DES membranes to an output connection point, the output connection point configured to receive a load.

24. The VSA of claim 23, wherein the plurality of DES membranes are oriented such that surfaces of the plurality of DES membranes are parallel to a direction of force applied by the actuator.

\* \* \* \* \*